(12) United States Patent
Bernhardsgruetter et al.

(10) Patent No.: US 8,579,166 B2
(45) Date of Patent: Nov. 12, 2013

(54) DEVICE FOR DOSING A METERED AMOUNT OF A POWDERED PRODUCT AND BEVERAGE MACHINE USING SUCH A DEVICE

(75) Inventors: Raphael Bernhardsgruetter, St. Gallen (CH); Cedric Beausire, Bavois (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 303 days.

(21) Appl. No.: 12/994,501

(22) PCT Filed: May 27, 2009

(86) PCT No.: PCT/EP2009/056421
§ 371 (c)(1),
(2), (4) Date: Jan. 21, 2011

(87) PCT Pub. No.: WO2009/144239
PCT Pub. Date: Dec. 3, 2009

(65) Prior Publication Data
US 2012/0006850 A1   Jan. 12, 2012

(30) Foreign Application Priority Data
May 29, 2008  (EP) .................................... 08157212

(51) Int. Cl.
*G01F 11/28* (2006.01)

(52) U.S. Cl.
USPC ..................... 222/452; 222/129.3; 222/145.5; 222/333; 99/289 R (58) Field of Classification Search
USPC ............... 222/71, 129.3, 129.4, 142.8, 145.6, 222/153.04, 452, DIG. 8, 145.5, 216–218, 222/354, 367, 370, 425–427, 430, 333; 366/130; 99/289 R, 295
See application file for complete search history.

(56) References Cited

U.S. PATENT DOCUMENTS

| | | | | |
|---|---|---|---|---|
| 830,543 | A * | 9/1906 | Trump | 366/178.1 |
| 1,741,325 | A * | 12/1929 | McDonald | 222/145.6 |
| 2,600,391 | A * | 6/1952 | Cabot | 141/51 |
| 2,877,937 | A * | 3/1959 | Weir | 222/452 |
| 3,055,559 | A * | 9/1962 | Allison | 222/242 |
| 3,179,303 | A * | 4/1965 | Dankoff et al. | 222/248 |
| 3,211,334 | A * | 10/1965 | McShea | 222/39 |
| 3,269,612 | A * | 8/1966 | Bode | 222/197 |
| 3,308,995 | A * | 3/1967 | Lee et al. | 222/427 |
| 4,032,050 | A * | 6/1977 | Funk | 222/284 |

(Continued)

FOREIGN PATENT DOCUMENTS

FR   1 431 228   3/1966

*Primary Examiner* — Kevin P Shaver
*Assistant Examiner* — Patrick M Buechner
(74) *Attorney, Agent, or Firm* — K&L Gates LLP (57) ABSTRACT

The invention concerns a dosing device for dosing a metered amount of a powdered product comprising: —a fixed body (2) made of at least a disc presenting a single pierced aperture (5), —a rotary top disk (1) disposed on the top of the fixed body (2) and presenting a taking out pierced aperture (4), —a rotary bottom disk (3) disposed on the bottom of the fixed body and presenting a discharging pierced aperture (6), —a rotary shaft (7) connecting the bottom disk (1) and the top disk (3), wherein in the stand-by position of the device the metered pierced aperture (5) is empty and closed to the atmosphere. The invention also concerns a beverage preparation apparatus implementing such a dosing device.

12 Claims, 9 Drawing Sheets

(56) References Cited

U.S. PATENT DOCUMENTS

| | | | |
|---|---|---|---|
| 4,071,171 A | | 1/1978 | Bassignani |
| 4,174,058 A | * | 11/1979 | Bassignani .................... 222/438 |
| 4,345,700 A | * | 8/1982 | Souza ............................ 222/438 |
| 4,997,405 A | * | 3/1991 | Dabrowski ....................... 453/57 |
| 5,014,877 A | * | 5/1991 | Roos .............................. 221/265 |
| 5,469,992 A | * | 11/1995 | Jenkins ......................... 222/362 |
| 5,495,962 A | | 3/1996 | Nomura |
| 7,090,098 B2 | * | 8/2006 | Livingston et al. ........... 222/651 |
| 8,230,774 B1 | * | 7/2012 | Hunte .......................... 99/289 R |
| 8,312,806 B2 | * | 11/2012 | De Graaff et al. ............... 99/295 |
| 2004/0118871 A1 | * | 6/2004 | Coronado et al. ......... 222/129.1 |
| 2006/0150821 A1 | * | 7/2006 | Paul et al. ....................... 99/279 |
| 2007/0187433 A1 | * | 8/2007 | Webster et al. ............... 222/370 |
| 2008/0054014 A1 | * | 3/2008 | Webster et al. .................... 222/1 |

* cited by examiner

DEVICE FOR DOSING A METERED AMOUNT OF A POWDERED PRODUCT AND BEVERAGE MACHINE USING SUCH A DEVICE

The present invention relates to device for metering and discharging accurately measured amounts of powder materials from a container storing the powder material, particularly for the preparation of beverages by dilution of metered doses of food soluble ingredients.

Existing devices for metering and discharging powder from a storing container usually comprise three parts: one part in contact with the powder storing container comprising an aperture for taking powder out of the container, a second part for metering the powder taken out by the first part, a third part presenting an aperture for discharging the metered dose of powder. The devices of the state of the art can be based on different general principles according to the type of parts that can be moved.

According to a first principle, the part of the device that can be moved is the second part that is the part for metering the powder. For example WO 02/064006 describes such a device for batch dispensing powder product like instant coffee. The device is composed of a body having a metered passage extending therethrough from a first aperture facing the powder storing container to a second aperture facing away from the powder storing container. The body is moveable between a first position where the first aperture is opened and the second aperture is closed so that powder from the storing container can flow inside the metered passage of the body and a second position where the first aperture is closed and the second aperture is opened so that powder can be discharged from the metered passage of the body. The body can be a disc arranged for rotation around the disc axis and comprising at least one passage extending from one circular surface of the disc to the other opposite circular surface of the disc. The disc is arranged for rotation between a first and a second fixed plates adjacent the circular surfaces of the body disc and each plate has an aperture intended either for allowing powder to enter the body passage or to exit said passage. According to a first variant, the disc of the body presents several metered passages that further to the rotation movement of the body disc are successively first charged with powder when they face the aperture of the first plate, secondly moved to the aperture of the second plate where the powder is discharged of the passage. In this variant, between two dosing actions, powder stays trapped in one of the metered passages. This powder is not well isolated from the atmosphere inside the metered passage compared to the powder stored in the container. If the dosing device is not used during a rather long time, the first powder doses that is delivered after this time doesn't present a good quality especially if the powder is sensible to the atmosphere. According to a second variant, the disc of the body presents only one metered passage that is rotated to and fro between under the aperture of the first plate, where the powder is charged in the passage, and the aperture of the second plate where the powder is discharged of the passage. In these first and second variants, the powder leaves always the container through the first plate aperture, said aperture being fixed. A drawback of such a configuration is that when the container is almost empty, a certain quantity of powder stays on the part of the plate that does not present any aperture and cannot flow inside the dosing device without adding complicated devices (rack) for pushing the rest of powder in the plate aperture.

According to a second principle, the second part for metering the powder can be fixed and the other parts for taking powder out of the container and for discharging the metered dose of powder are movable. U.S. Pat. No. 2,877,937 describes such a metering device comprising a body metering member having four compartments opened at both ends and two caps co-rotatable relative to the body. The outlet cap has a discharge passage adapted to be aligned with a compartment at its outlet end upon relative rotation of the outlet cap and the body. The inlet cap has an inlet passage which likewise is adapted to be aligned with the compartments at their inlet ends upon relative rotation of the inlet cap and the body. The outlet passage of the outlet cap and the inlet passage of the inlet cap are offset from each other circumferentially. Then this device presents also the disadvantage of keeping the powder trapped in a compartment between to dosing actions with the risk of damaging the quality of the powder.

On the same principle, U.S. Pat. No. 5,495,962 and EP 0 001 411 describe metering devices comprising a fixed body with a storing aperture and two rotatable discs presenting passages that are offset from each other circumferentially. The discs are rotated to and fro between a first position where the top disc passage faces the storing aperture of the body for charging it with powder and a second position where the bottom disc passage faces the storing aperture of the body for discharging it. A drawback of these devices is that when the container is almost empty, a certain quantity of powder stays on the part of the plate that does not present any aperture and cannot flow inside the dosing device without adding complicated devices (stirring vane) for pushing the rest of powder in the plate aperture.

Then there is a need for a powder metering device enabling simultaneously to maintain the delivery of a constant quality stored powder even if dosing actions are spaced in time and to enable the full emptying of the powder container without implementing complicated devices like stirring blades or racks.

In a first aspect, the invention relates to a dosing device for dosing a metered amount of a powdered product comprising:
a fixed body comprising at least a disc presenting a single pierced aperture,
a rotary top disk disposed on the top of the fixed body and presenting a taking out pierced aperture,
a rotary bottom disk disposed on the bottom of the fixed body and presenting a discharging pierced aperture,
a rotary shaft connecting the bottom disk and the top disk, wherein in the stand-by position of the device the metered pierced aperture is empty and closed to the atmosphere.

The device of the invention is composed of at least three overlaid discs. The middle disc is a fixed body presenting a single pierced aperture. The volume of said aperture corresponds to the metered amount of the powdered product to be dosed. The body disc is provided with an axial bearing passage for receiving and rotatably supporting the coaxial shaft of the two other rotary discs. The two other discs covering the top and the bottom surface of the body disc are each able to rotate and to make a grand tour during the dosing operation. These two discs are connected to the rotary shaft so that they are co-rotatable relative to the body.

Each of the discs of the device presents a pierced aperture. The apertures are preferably disposed one relative to the others so that in the stand-by position the taking out pierced aperture of the rotary top disk is disposed before the single pierced aperture of the fixed body and the discharging pierced aperture of the rotary bottom disk is disposed after the single pierced aperture of the fixed body according to the rotation sense of the top and bottom rotary discs. The three apertures in the three discs are sufficiently circularly shifted from one to the others so that the single pierced aperture of the body discs cannot be simultaneously recovered by a part of the taking out pierced aperture of the rotary top disk and a part of the discharging pierced aperture of the rotary bottom disk whatever the angular position of the rotary discs. In the stand-by position, neither the taking out pierced aperture of the rotary top disk nor the discharging pierced aperture of the rotary bottom disk recovers the single pierced aperture of the fixed body.

The rotary top disk and the rotary bottom disk can be disposed one relative to the other so that the taking out pierced aperture is 180° farther the discharging pierced aperture. In the stand-by position, the taking out pierced aperture can be disposed 90° before the metered pierced aperture of the fixed body and the discharging pierced aperture can be disposed 90° after the metered pierced aperture of the fixed body according to the sense of rotation of the rotary top and bottom disks.

The pierced apertures in the three discs can be of any shape. In a preferred embodiment, the surface of the taking out pierced aperture of the top rotary disk is greater than the surface of the single pierced aperture of the fixed body. This guarantees a total filling of the body disc pierced aperture since the edge of the taking out pierced aperture of the top rotary disk that is the latest to slide above the body disc pierced aperture is able to complete the filling of the body disc pierced aperture by pushing powder inside said aperture.

According to the preferred embodiment of the invention, the rotary top disk and the rotary bottom disk are able to rotate only in one sense. The discs cannot rotate to and fro between different positions. Then a complete rotation of the discs is necessary to meter a measured amount of powder product with the dosing device of the present invention.

According to a specific embodiment, the disk of the fixed body can present a slit linking the edge of said disk to a cavity inside the fixed body emerging on the discharging pierced aperture in the stand-by position of the device. This slit is useful for providing an air current inside the discharging pierced aperture in particular when hygroscopic powders are delivered. For example, when the dosing device is used for delivering a beverage powder in a chamber or a container where it is mixed with a fluid, moisture can settle in the discharging pierced aperture. The provision of an air current enables the drying of the aperture before it is used again for discharging a new dose of powder.

According to an other specific embodiment, the fixed body can comprise a first disc presenting a single pierced aperture and a second disc presenting several metered pierced apertures and the relative position of said discs is adjustable in order to have one metered pierced aperture of the second disc facing the pierced aperture of the first disc. This embodiment enables the choice of the metered volume that is to be delivered by the dosing device. The second disc of the body defines different apertures of different volumes and the first disc enables the selection of one of these different apertures by placing the single pierced aperture of the first disc above the selected metered pierced aperture of the second disc. The selection of the metered aperture is usually done manually by dismantling the device and changing the relative position of the first and the second disc in the body.

The dosing device of the present invention is preferably dismountable for example for washing.

In a second aspect, the present invention relates to a beverage preparation apparatus comprising:
 a storing powder soluble food ingredient container,
 a mixing chamber,
 a dosing device as described above where the top side of the dosing device cooperates with the storing powder soluble food ingredient container and the bottom side of the dosing device cooperates with the mixing chamber.

The dosing device of the present invention is especially useful for beverage preparation apparatus comprising a mixing chamber that is movable between:
 a metering position, where the discharging pierced aperture of the rotary bottom disc emerges in the mixing chamber inlet, and
 a mixing position, where the discharging pierced aperture of the rotary bottom disc does not emerge in the mixing chamber inlet.

According to a first variant of the apparatus, in the metering position, no diluent feeding means emerge in the mixing chamber. Then the risk of wetting the dosing device is avoided. Then preferably, the mixing chamber is movable to a mixing position, where diluent feeding means of the apparatus emerge in the mixing chamber inlet.

According to a second variant of the apparatus, the mixing chamber comprises at least one diluent feeding means provided through one of its wall and, in the metering position, diluent feeding means are not able to inject the diluent in the mixing chamber. This variant corresponds to the case of a mixing chamber with integrated diluent feeding means through one of its wall. It means then that the feeding means are movable with the mixing chamber. To avoid the risk of wetting the dosing device when the mixing chamber is in the metering position, the delivery of diluent through these feeding means is made impossible.

The invention also concerns an apparatus comprising:
 first diluent feeding means connected to a side wall of the mixing chamber,
 second diluent feeding means comprising a nozzle directed toward the area of a receptacle for delivering a frothing diluent volume to the receptacle.

Advantageously, the same motor can be used to move the mixing chamber and rotate the rotary bottom and top disks. In a preferred embodiment, the rotary bottom disc cooperates with a main notched gear presenting a central pin able to cooperate with and drive the rotary shaft of the dosing device and a delivery hole that faces the discharging pierced aperture of the rotary bottom disc. The teeth of the notched gear enable its driving by a motor, for example through an intermediate second notched gear rotated by the motor. The main notched gear present a central pin or a shaft that can cooperate with the shaft of the dosing device, then the motor can drive the rotation of the dosing device rotary discs. In order to avoid the obstruction of the discharging aperture of the rotary bottom disc, the notched gear presents a delivery hole that faces that discharging aperture of the rotary bottom disc. The upper face of the notched gear and the below face of the rotary bottom disc can present corresponding connecting means for improving the driving of the disc by the notched gear. This connecting means should be easily releasable so that the dosing device can easily separate the dosing device from the notched gear for cleaning.

According to this preferred embodiment, the mixing chamber is preferably connected to the main notched gear by a connecting rod, the extremity of said connecting rod that comprises the rotary axis being connected to the notched gear in such a place that in the metering position, the inlet of the mixing chamber faces the delivery hole of the notched gear. The use of the connecting rod enable the linear translation of the mixing chamber from the mixing position that is distant from the dosing device to the metering position where the mixing chamber inlet faces the delivery hole of the notched gear and then the discharging aperture of the rotary bottom disc. In the mixing position, diluent can be introduced in the mixing chamber inlet and due to the remote position of the mixing chamber at this step, the humidity created by the diluent cannot rise in the dosing device. Besides in this mixing position of the mixing chamber, the notched gear is in such an angular position that in the dosing device, the pierced aperture of the fixed body is closed up and down by the top and the bottom rotary discs. Consequently, the risk of introduction of humidity in the dosing device is efficiently reduced.

This advantage can be even more improved when the disk of the fixed body presents a slit linking the edge of said disk to a cavity inside the fixed body. This cavity emerges in the discharging pierced aperture in the stand-by position of the device and the slit is connected to a fan. Then the current of air provided by the fan can improve the drying of the discharging pierced aperture.

The characteristics and advantages of the invention will be better understood in relation to the figures which follow.

Figure 1A:
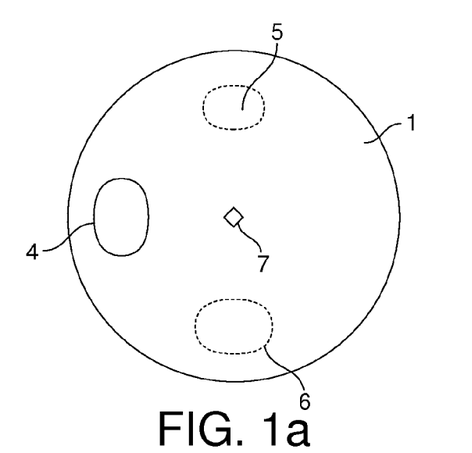
FIGS. 1a to 1c are schematic drawings to illustrate the relative positions of the apertures of the fixed body, the rotary top disk and the rotary bottom disk during the dosing operation.
Figure 1B:
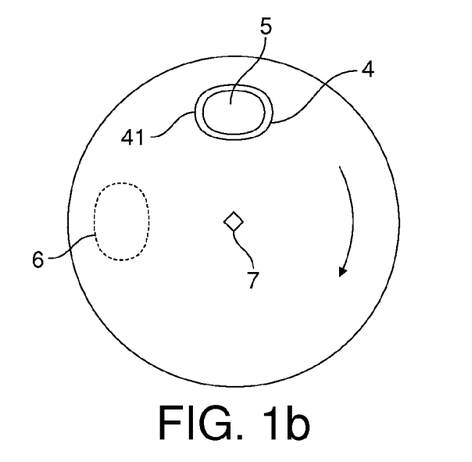
Figure 1C:
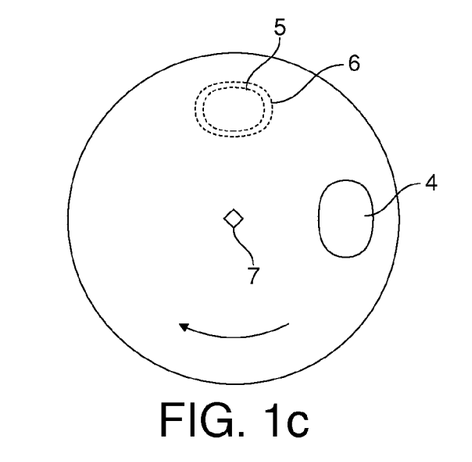

FIG. 1a to 1c illustrate the relative positions of the apertures of the fixed body, the rotary top disk and the rotary bottom disk during the dosing operation view from the top. FIG. 1a corresponds to the stand-by position of the dosing system: in operation, the rotary top disk 1 is in contact with a powder container. The taking out pierced aperture 4 of the rotary top disk 1 and the discharging pierced aperture 6 (dotted line) of the rotary bottom disk are offset from the pierced aperture 5 (dotted line) of the fixed body so that this one is closed to the atmosphere.

When the dosing device is activated the rotary top disk 1 and the rotary bottom disk 3 are moved together through clockwise movement of the axis 7 whereas the central disc of the fixed body 2 is fixed. Consequently the pierced aperture 5 of the fixed body remains in place while the taking out pierced aperture 4 and the discharging pierced aperture 6 rotate.

FIG. 1b shows the moment in the dosing operation where the taking out pierced aperture 4 moves above the pierced aperture 5 enabling powder to fall inside the metered pierced aperture 5. The surface of the taking out pierced aperture 4 is larger than the surface of the metered pierced aperture 5 so that during the rotation movement, the time for letting powder falls inside the metered single aperture 5 is sufficiently long. Then the back edge 41 of the taking out pierced aperture 4 can scrape the surface of the powder inside the metered single aperture 4. Simultaneously the discharging pierced aperture 6 (dotted line) of the rotary bottom disk has moved but it is still offset from the pierced aperture 5 so that there is no contact of the atmosphere with the powder stored above the top rotary disc 1.

FIG. 1c shows the moment in the dosing operation where the discharging pierced aperture 6 (dotted line) moves under the pierced aperture 5 (dotted line) enabling powder to be discharged from the metered pierced aperture 5. Simultaneously the taking out pierced aperture 6 of the rotary top disk has moved but it is offset from the pierced aperture 5 so that there is no contact of the atmosphere with the powder stored above the top rotary disc 1. Then the top and the bottom discs continue to rotate until they have turned 360° coming back to the stand-by position of FIG. 1a. In this stand-by position, the pierced aperture 5 does not comprise any powder since it has not been covered by the taking out pierced aperture 4 and since it was emptied according to FIG. 1b. Then it is closed to the atmosphere.

The method for metering one dose of powder implies the complete rotation of the top rotary disk until it has reached its initial position. This complete movement enables the stirring of the powder in the tank above the top rotary disk which avoids the formation of form loose and/or hard clumps, cliff building, bridges, or triangular or pyramidal piles within the tank which have a significant influence on the powder supply and dosing operation of the device. Such a problem occurs even more frequently in regions with high humidity since moisture supports the agglomeration of the powder. According to the present invention, powder can freely flow into the dosing device.

Figure 2:
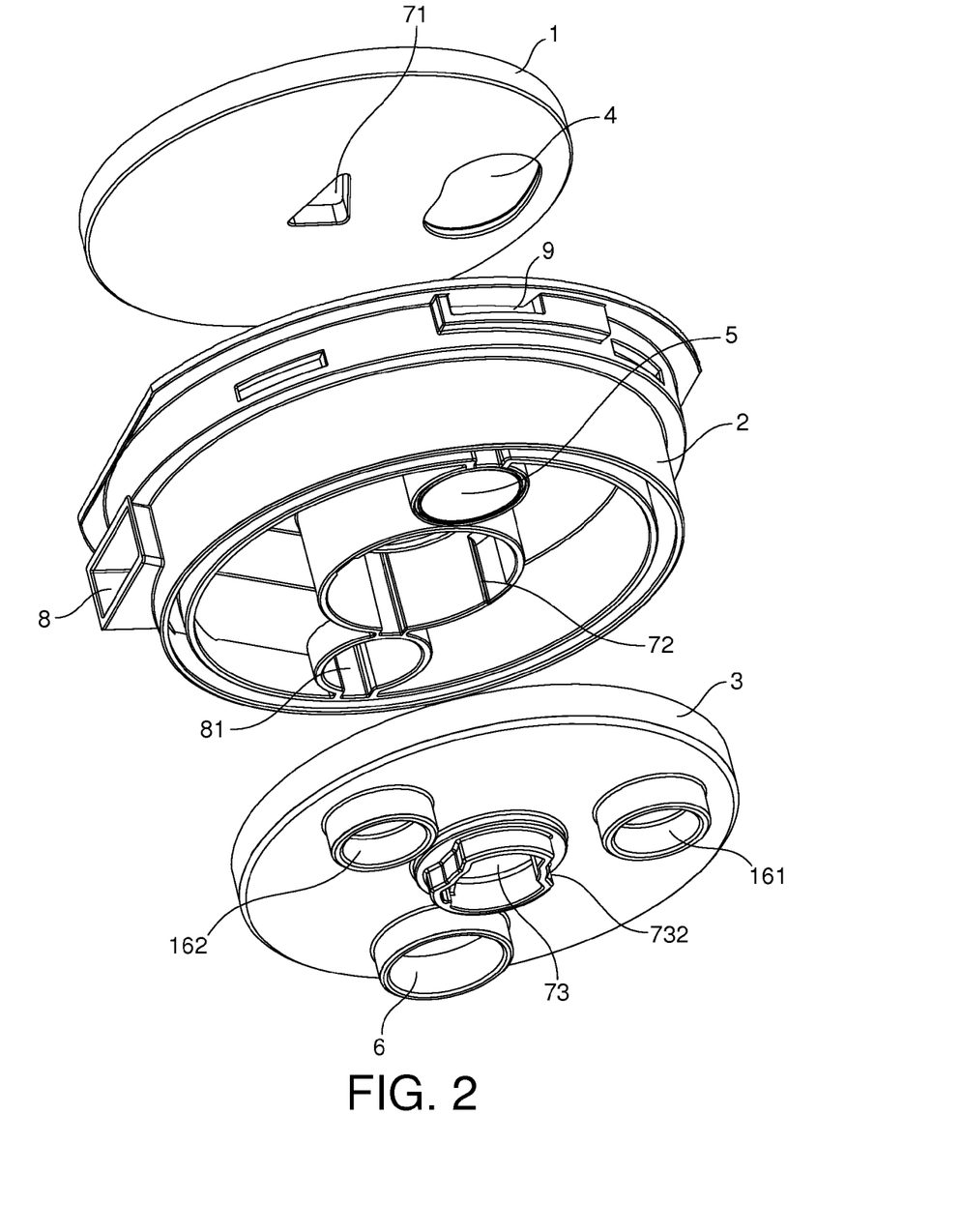
FIG. 2 is an exploded view of the fixed body, the rotary top disk and the rotary bottom disk in the dosing device of the present invention.

FIG. 2 is an exploded view of the fixed body 2 and the rotary discs 1, 3 of the dosing device of the present invention. This dosing device comprises a fixed body in the form of a disc 2 presenting a single pierced aperture 5. This aperture is defined so as to deliver a metered volume of powder. The disc 2 of the fixed body also presents a central aperture 72 for introducing and supporting the shaft 7 of the dosing system. The disc 2 of the fixed body can be empty or full. It can present a slit 8 inside its edge linked to a cavity 81 emerging on the discharging pierced aperture 6 in the stand-by position of the dosing device. This slit 8 can be connected to a fan so as to provide a current of air for drying the discharging pierced aperture 6 when it moves in the stand-by position. Above the fixed body is the rotary top disc 1 presenting its taking out pierced aperture 4 and connection means 71 with the shaft 7. Under the fixed body is the rotary bottom disc 3 presenting its discharging pierced aperture 6 and connection means 73 with the shaft 7. In the stand-by position, the discs 1, 2 and 3 are positioned one relative to the other so that no apertures 4, 5, 6 overlap each other and so that in the clockwise rotation of the top and the bottom rotary discs 1, 3 the taking out pierced aperture 4 overlaps the single pierced aperture 5 before the discharging pierced aperture 6. For example, the taking out pierced aperture 4 of the rotary bottom disc 1 is placed 90° before the single pierced aperture 5 and the discharging pierced aperture 6 is placed 180° before the single pierced aperture 5. The shaft is conceived so as to engage the top and the bottom rotary discs 1, 3 and leave the disc 2 of the fixed body immobile. It engages the top rotary disc 1 for example by the means of a pin (711 see FIG. 3) of which form corresponds to the slot 71 inside the under side of the top rotary disc 1. It engages the bottom rotary disc 1 by the means of blades (712 see FIG. 3) which can slide inside corresponding slots 732 in the bottom rotary disc 1. The orientation of the means 71, 711, 732 for connecting the shaft with the top and the bottom rotary discs 1, 3 are defined so as to set the relative positions of these two discs when the dosing device is assembled.

Figure 3:
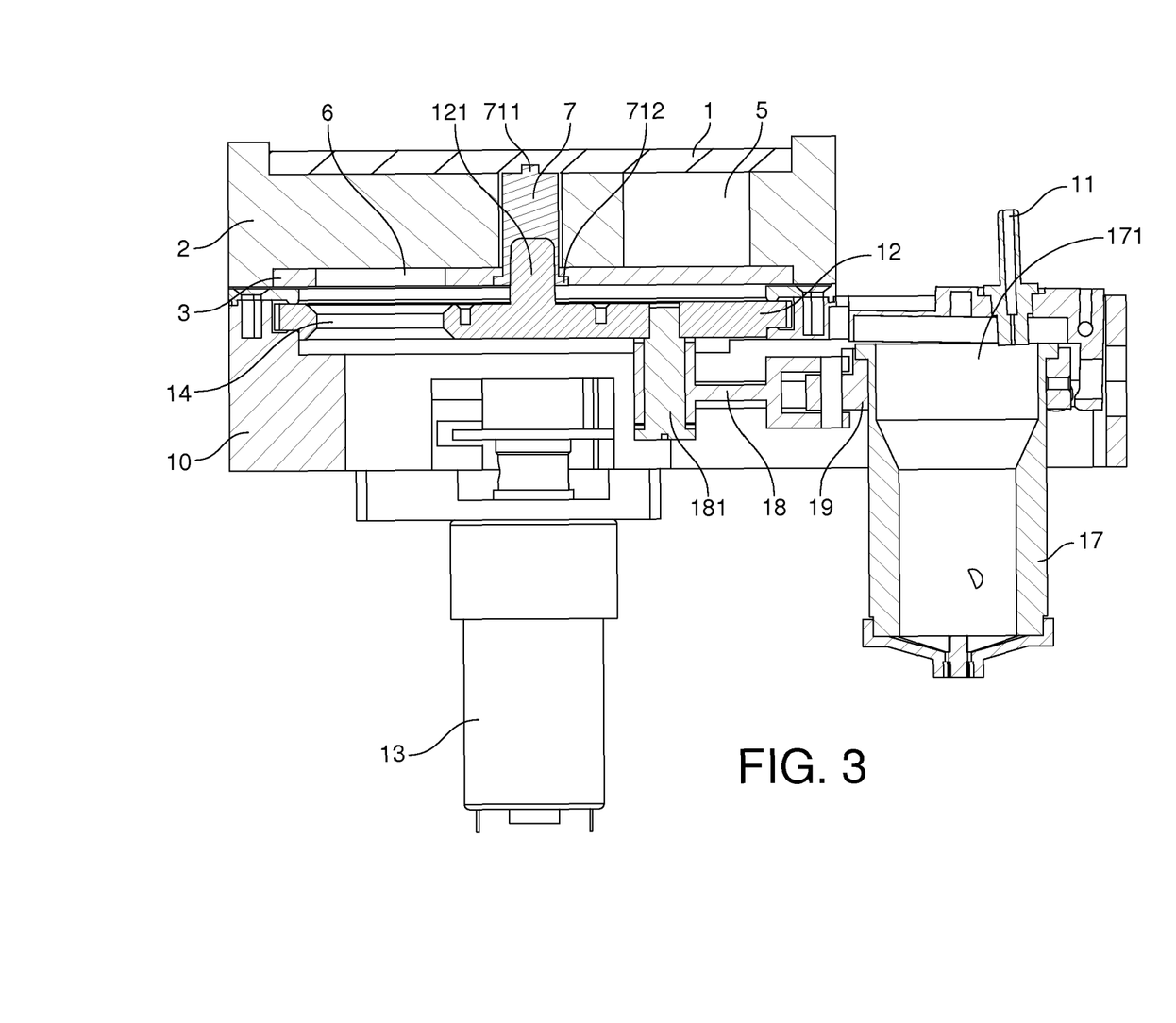
FIG. 3 is a section view of a beverage preparation machine incorporating a dosing device according to the present invention and a movable mixing chamber.

FIG. 3 is a section view of a beverage preparation machine incorporating a dosing device according to the present invention (schematically represented) and a movable mixing chamber. The description is made in correspondence with FIGS. 4 to 6. This machine comprises a storing powder soluble food ingredient container (not represented) of which bottom part lays on the dosing device 1, 2, 3, 5, 7. The bottom part of the container can comprise a scraping means on which the top rotary disc 1 can be rubbed when it rotates in order to scrape away the remaining powder from the disc, particularly when a few powder remains in the container. The assembly of the container and the dosing device are supported by the frame 10 of the machine. The dosing device is connected to the motor 13 machine through the shaft 7 of the dosing device. These connection means are a main notched gear 12 with a central pin 121 able to enter inside a recess at the bottom of the shaft 7. This notched gear 12 is linked to the motor 13 through a second small notched gear 15 directly linked to the motor 13. The notched gear 12 connected to the shaft 7 of the dosing device presents an off-centre hole 14 enabling the discharging of the powder from the dosing device to the beverage preparation section of the machine. The dosing device and the notched gear 12 are connected one to each other so that the hole 14 located in the notched gear 12 always faces the discharging pierced aperture 6 of the rotary bottom disk 3. An embossment 16 exists in the upper face of the notched gear 12 in which corresponding protuberances 161, 162 of the rotary bottom disk 3 of the dosing device are able to enter to help in the driving of the rotary bottom disk 3 and the rotary top disk 1. Preferably the dosing device is positioned inside the machine so that the pierced aperture 5 of the fixed body 2 is placed at the nearer possible position from the mixing chamber 1, when the latter is in the mixing position. Then it avoids a too important movement of the mixing chamber 17 for coming to the metering position.

Figure 4:
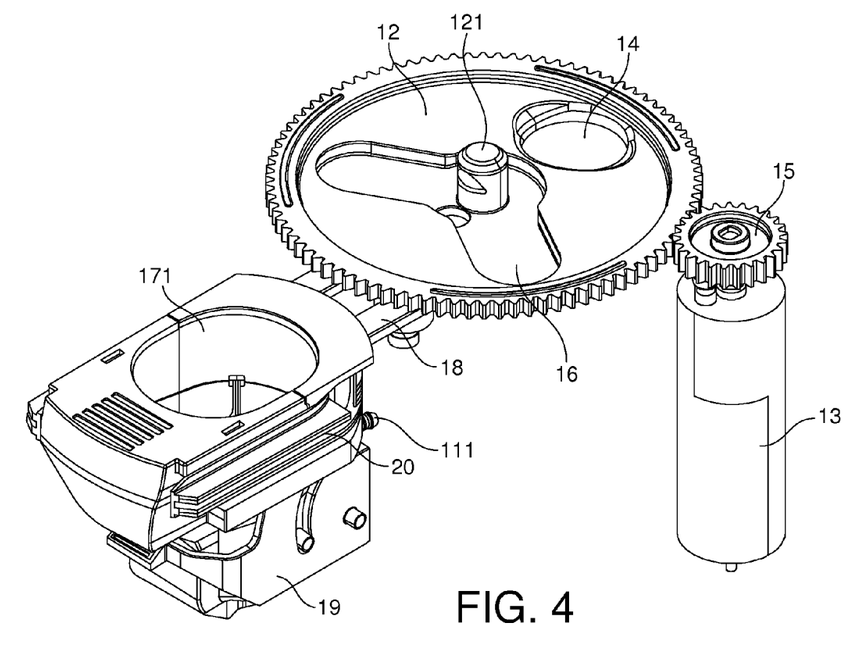
FIGS. 4, 5 and 6 are different views of the part of the beverage preparation machine enabling the simultaneous movement of the mixing chamber and the dosing device.
Figure 5:
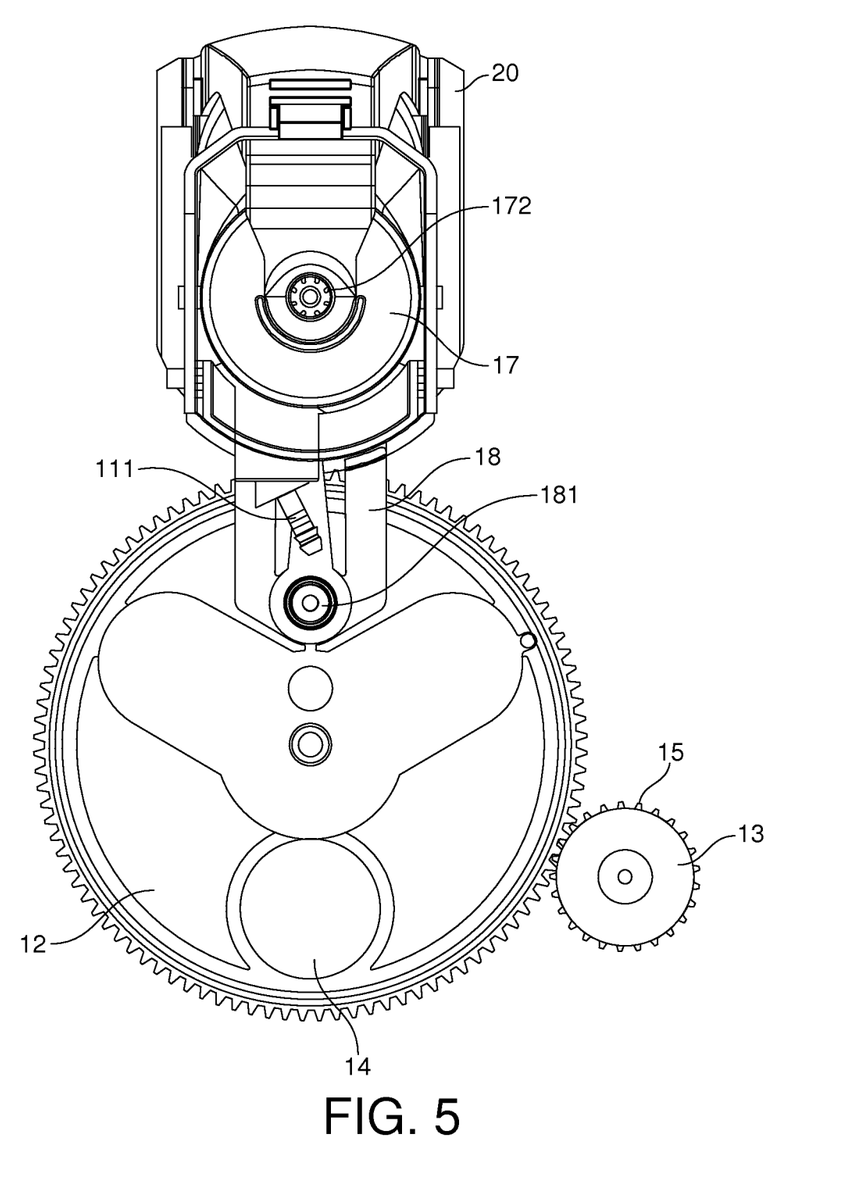
Figure 6:
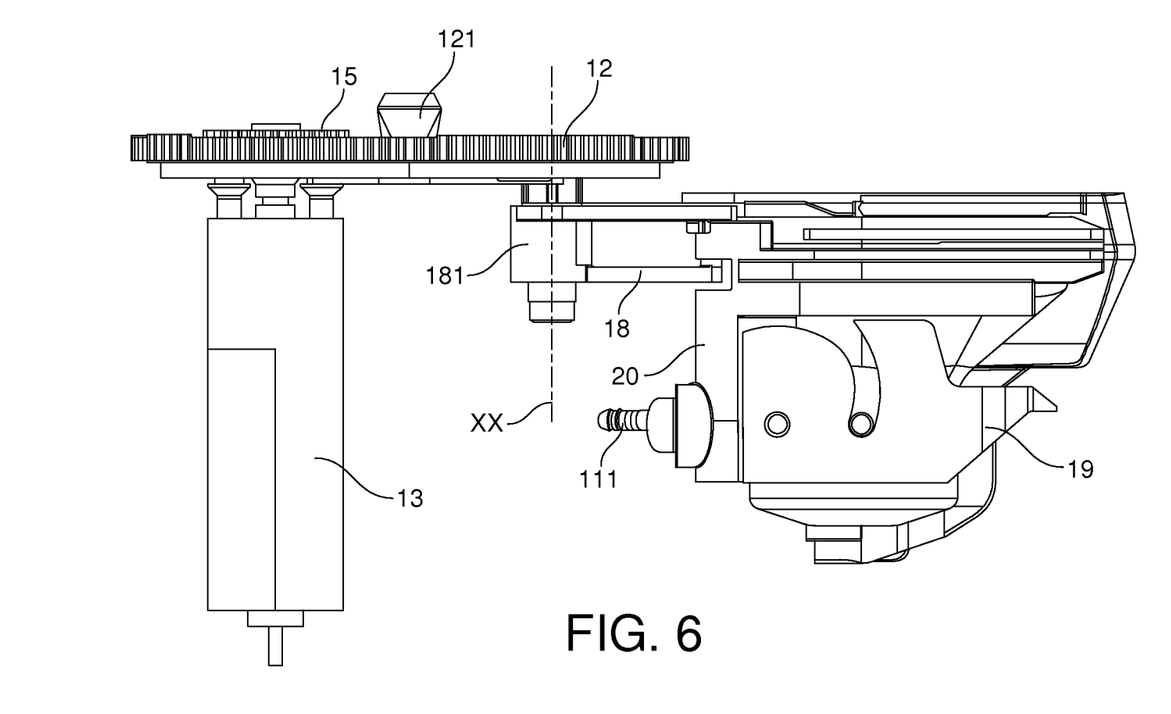
Figure 7:
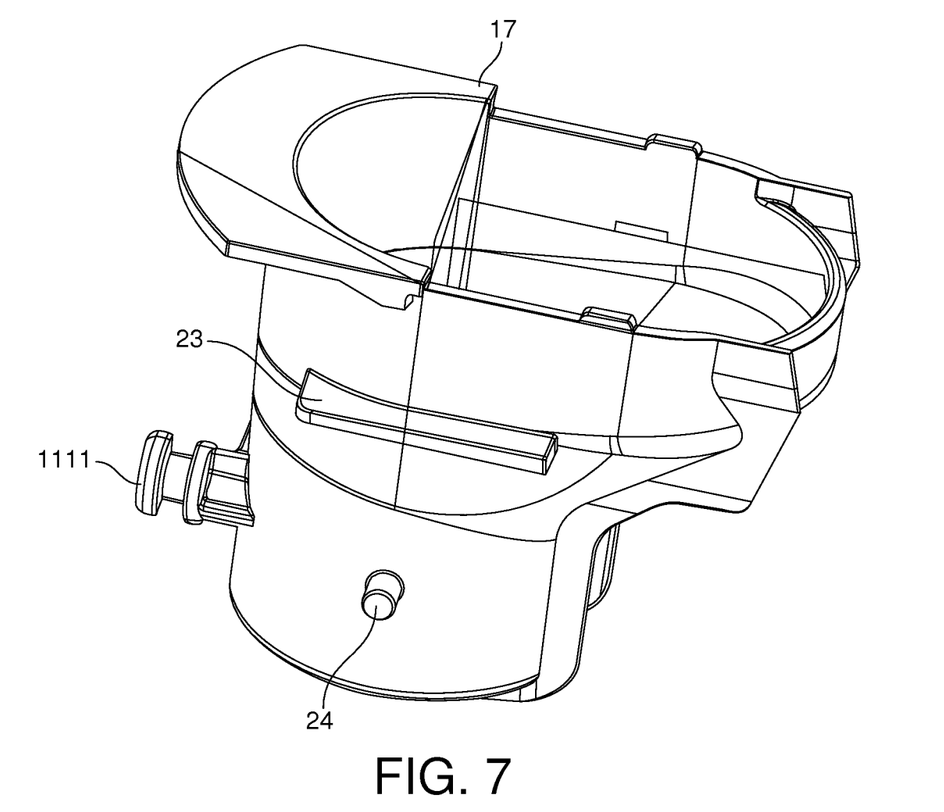
FIGS. 7, 8 and 9 illustrate respectively the slider, the mixing chamber and the lever to support the description of the movement of the mixing chamber.
Figure 8:
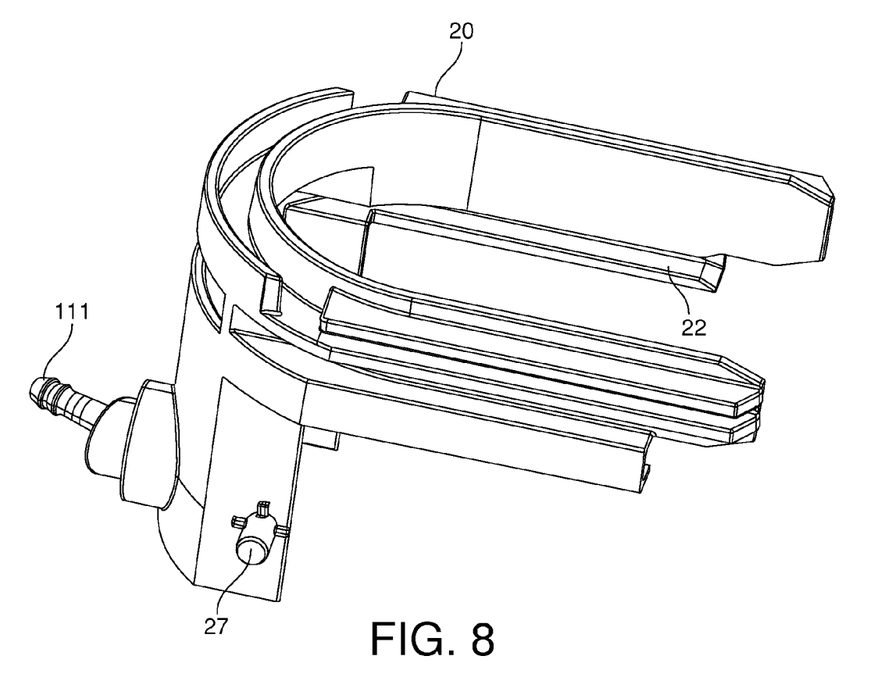
Figure 9:
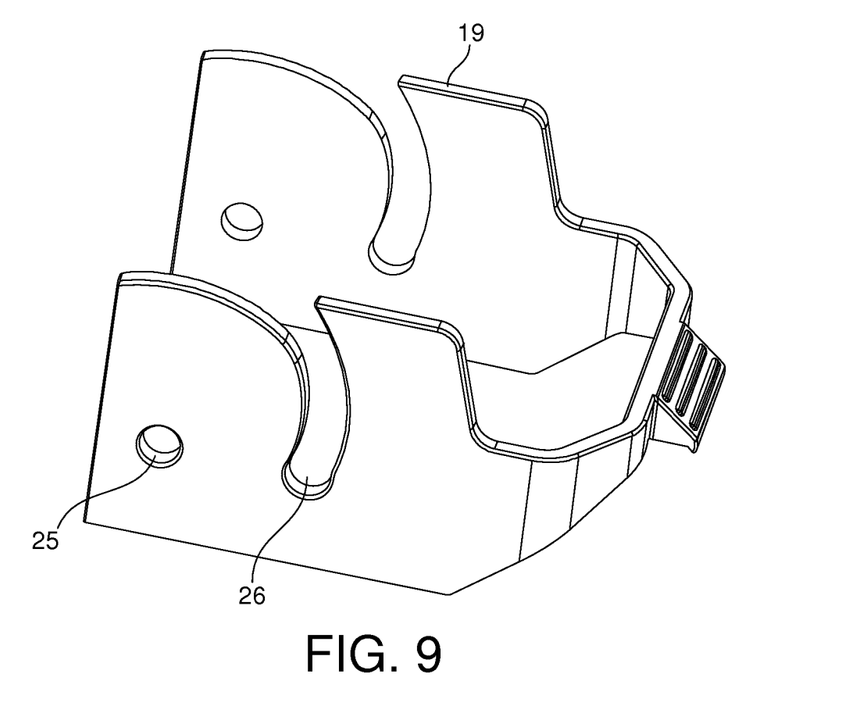

The same motor enables the movement of the mixing chamber 17 from a mixing position where the inlet 171 of the chamber is placed away from the dosing device. In this mixing device, the mixing chamber inlet 171 can be placed under diluent feeding means 11 for providing a diluent in the chamber in which a beverage soluble ingredient has been introduced during the metering step in the metering position. FIGS. 4 to 6 illustrate other types of diluent feeding means 111 connected to the side wall of the mixing chamber. In FIGS. 3 to 6, the mixing chamber 17 is represented in the mixing position. As detailed in FIGS. 7 to 9, a slider 20 supports the mixing chamber: it comprises an internal space presenting side grooves 22 in which rims 23 on the external sides of the mixing chamber 17 can slide to support the mixing chamber. The slider presents diluent feeding means 111 that are connectable with the corresponding diluent feeding means 1111 of the mixing chamber. The slider 20 is attached to the connecting rod 18 so that the notched gear 12 can move the slider back and forth. A lever 19 is hooked on the slider 20 to anchor the mixing chamber during beverage operation. The lever 19 and the slider 20 are connected by introducing the lateral pins 27 of the slider into lateral holes 25 of the lever; this connection enables the rotation of the lever around the axis formed by the lateral pins 27 of the slider. Moreover the lever presents a control curve 26 on each of its lateral side that cooperates with the guiding pin 24 on each lateral side of the mixing chamber to help the movement of the lever either to anchor or to free the mixing chamber.

The other extremity 181 of the connecting rod 18 is connected to the below face of the main notched gear 12. This last extremity 181 comprises the rotary axis XX of the connecting rod. When the main notched gear 12 rotates, it drives the extremity 181 of the connecting rod 18 comprising the rotary axis XX: starting from the mixing position, the connecting rod pulls the driver 20 and the mixing chamber 17 in direction of the dosing device. The extremity 181 of the connecting rod comprising the rotary axis XX is connected on the notched gear 12 on a diametral opposed position to the hole 14 in the notched gear 12. Consequently, when the notched gear 12 rotates 180°, the mixing chamber is in its nearer position from the dosing device and the hole 14 in the notched gear 12 is just above the mixing chamber inlet 171; it corresponds to the metering position. Simultaneously the central pin 121 of the notched gear 12 drives the rotary discs 1, 3 of the dosing device, so that when the notched gear 12 rotates 180°, the discharging pierced aperture 6 faces the mixing chamber inlet 171 through the hole 14 in the notched gear 12. As detailed in FIGS. 1a to 1c, this 180° rotation enables the discharging pierced aperture 6 to face the pierced aperture 5 then the metered powder can fall from this pierced aperture 5 inside the mixing chamber 17. Then, the notched gear 12 turns again 180° moving the slider 20 and the mixing chamber 17 away from the dosing device under the diluent feeding means 11 or in a position where the diluent feeding means 111 can be operated.

REFERENCES ON FIGURES 1 rotary top disc
2 fixed body
3 rotary bottom disc
4 taking out aperture
41 back edge of taking out aperture
5 pierced aperture
6 discharging pierced aperture
7 shaft
71 slot
711 pin
712 blade
72, 73 central aperture
732 slots
8 slit
81 cavity
9 container connection means
10 frame
11, 111, 1111 diluent feeding means
12 main notched gear
121 central pin
13 motor
14 delivery hole
15 second notched gear
16 embossment
161, 162 protuberance
17 mixing chamber
171 mixing chamber inlet
172 mixing chamber outlet
18 connecting rod
181 connecting rod extremity comprising the rotary axis
19 lever
20 slider
22 slider grooves
23 mixing chamber rim
24 mixing chamber guiding pin
25 lever holes
26 lever control curve
27 slider lateral pins

The invention claimed is:
1. A beverage preparation apparatus comprising:
a powder soluble food ingredient storage container;
a mixing chamber;
a dosing device for dosing a metered amount of a powdered product comprising:
a fixed body comprising at least a disc having a single pierced aperture;

a rotary top disk located on a top of the fixed body and comprising a taking out pierced aperture;

a rotary bottom disk located on a bottom of the fixed body and comprising a discharging pierced aperture;

a rotary shaft connecting the bottom disk and the top disk;

in a stand-by position of the device the single pierced aperture is empty and closed to the atmosphere;

the top side of the dosing device cooperates with the storing powder soluble food ingredient container and the bottom side of the dosing device cooperates with the mixing chamber; and the mixing chamber is movable between:

a metering position, where the discharging pierced aperture of the rotary bottom disc emerges in the mixing chamber inlet; and a mixing position, where the discharging pierced aperture of the rotary bottom disc does not emerge in the mixing chamber inlet.

2. A beverage preparation apparatus according to claim 1 wherein the apertures of the dosing device are located one relative to the others so that in the stand-by position the taking out pierced aperture of the rotary top disk is located before the single pierced aperture of the fixed body and the discharging pierced aperture of the rotary bottom disk is located after the single pierced aperture of the fixed body according to the rotational direction of the top and bottom rotary discs.

3. A beverage preparation apparatus according to claim 1 wherein, in the dosing device, the taking out pierced aperture of the top rotary disk is wider in at least one direction relative to the single pierced aperture of the fixed body.

4. A beverage preparation apparatus according to claim 1 wherein in the dosing device the rotary top disk and the rotary bottom disk are able to rotate only in one direction.

5. A beverage preparation apparatus according to claim 1 wherein in the dosing device the disk of the fixed body presents a slit linking the edge of the disk to a cavity inside the fixed body emerging on the discharging pierced aperture in the stand-by position of the device.

6. A beverage preparation apparatus according to claim 1 wherein in the dosing device the fixed body is made of a first disc presenting a single pierced aperture and of a second disc presenting several metered pierced apertures and the relative position of the discs is adjustable in order to have one metered pierced aperture of the second disc facing the pierced aperture of the first disc.

7. A beverage preparation apparatus according to claim 1 wherein the mixing chamber is movable to a mixing position, where diluent feeding means enters the mixing chamber inlet.

8. A beverage preparation apparatus according to claim 1 wherein the mixing chamber comprises at least one diluent feeding means provided through a wall and in the metering position, diluent feeding means are not able to inject the diluent in the mixing chamber.

9. A beverage preparation apparatus according to claim 1 wherein a motor is used to move the mixing chamber and to rotate the rotary bottom and top disks.

10. A beverage preparation apparatus according to claim 1 wherein the rotary bottom disc cooperates with a main notched gear presenting a central pin able to cooperate with and drive the rotary shaft of the dosing device and a delivery hole that faces the discharging pierced aperture of the rotary bottom disc.

11. A beverage preparation apparatus according to claim 10 wherein the mixing chamber is connected to the main notched gear by a connecting rod, the extremity of the connecting rod that comprises the rotary axis is connected in such a manner that in the metering position, the inlet of the mixing chamber faces the delivery hole of the notched gear.

12. A beverage preparation apparatus according to claim 1 wherein the disc of the fixed body provides a slit linking the edge of the disc of the fixed body to a cavity inside the fixed body, the cavity emerging on the discharging pierced aperture in the stand-by position of the device and the slit being connected to a fan.

\* \* \* \* \*